United States Patent [19]

Tomaszek

[11] Patent Number: 4,809,854

[45] Date of Patent: Mar. 7, 1989

[54] FLOTATION APPARATUS FOR RECLAIMING BONDED, TWO-RESIN ARTICLES

[75] Inventor: Thomas R. Tomaszek, Blackstone, Mass.

[73] Assignee: Nelmor Co., Inc., North Uxbridge, Mass.

[21] Appl. No.: 94,514

[22] Filed: Sep. 9, 1987

Related U.S. Application Data

[62] Division of Ser. No. 2,123, Jan. 12, 1987, Pat. No. 4,728,045.

[51] Int. Cl.⁴ .......................... B03B 5/28; B03B 5/36
[52] U.S. Cl. .................................... 209/3; 209/10; 209/12; 209/39; 209/173; 241/20; 241/24; 241/DIG. 38
[58] Field of Search ............... 209/173, 172.5, 172, 209/17, 3, 12, 13, 10, 39; 241/20, 24, DIG. 38, 79.1

[56] References Cited

U.S. PATENT DOCUMENTS

| | | | |
|---|---|---|---|
| 439,905 | 11/1890 | Smith | 209/173 |
| 507,885 | 10/1893 | Cooper | 209/173 |
| 1,032,732 | 7/1912 | Blaine | 209/173 |
| 1,286,554 | 12/1918 | Dekker | 209/173 |
| 1,743,179 | 1/1930 | Zeb | 209/173 |
| 2,225,459 | 12/1940 | Palmrose | 209/173 |
| 2,378,356 | 6/1945 | Erck | 209/173 |
| 2,559,403 | 7/1951 | Cover | 209/173 |
| 2,606,660 | 8/1952 | Klep et al. | 209/173 |
| 2,635,104 | 4/1953 | Chayer | 209/173 |
| 2,670,078 | 2/1954 | Davis | 209/173 |
| 2,708,032 | 5/1955 | Heyman | 209/17 |
| 3,387,793 | 6/1968 | Burner . | |
| 3,582,004 | 6/1971 | Lenz | 209/17 |
| 3,650,396 | 3/1972 | Gillespie | 209/3 |
| 3,765,532 | 10/1973 | Morris | 209/17 |
| 3,928,181 | 12/1975 | Iseman | 209/173 |
| 4,044,956 | 8/1977 | Benedetto | 241/24 |
| 4,067,826 | 1/1978 | Emery | 260/2.3 |
| 4,073,661 | 2/1978 | Buzga | 264/37 |
| 4,079,837 | 3/1978 | Grube | 209/12 |
| 4,122,950 | 10/1978 | White | 209/12 |
| 4,159,242 | 6/1979 | Walker | 209/17 |
| 4,199,109 | 4/1980 | Watanabe | 241/14 |
| 4,208,015 | 6/1980 | Fujita | 241/16 |
| 4,276,155 | 6/1981 | Roeschlaub | 209/10 |
| 4,379,525 | 4/1983 | Nowicki | 241/20 |
| 4,440,635 | 4/1984 | Reiniger | 209/4 |

FOREIGN PATENT DOCUMENTS

| | | | |
|---|---|---|---|
| 1143086 | 1/1963 | Fed. Rep. of Germany | 209/17 |
| 2435286 | 5/1980 | France | 209/173 |
| 39464 | 12/1975 | Japan | 209/173 |
| 159943 | 12/1980 | Japan | 209/173 |
| 455856 | 10/1936 | United Kingdom | 209/173 |

OTHER PUBLICATIONS

Nelmor/Weiss Densification System, Nelmor Co., Bulletin No. 11-105.1.
Nelmor/Weiss, Bold Series Central Station Granulators, Nelmor Co., Bulletin No. 3-105.2.

Primary Examiner—David L. Lacey
Assistant Examiner—Thomas M. Lithgow
Attorney, Agent, or Firm—Kinzer, Plyer, Dorn, McEachran & Jambor

[57] ABSTRACT

A flotation apparatus used in reclaiming resin materials from bottles and other scrap articles each comprising a first low density resin component (e.g., polyethylene) bonded to a second high density resin component (e.g., polyethylene terephthlate); the scrap articles are granulated and air classified to form a primary particulate scrap which is flotation separated in two successive stages. The flotation separation stages each include a first auger in an apertured-bottom trough positioned near the top of a flotation tank with inlet means depositing a flow of particulate scrap and flotation liquid into one end of the trough; the heavy material output is afforded by a second auger in the bottom of the tank, whereas the lightweight material outlet is an overflow weir at one side of the tank. A vigorous washing apparatus using a hot aqueous medium connects the first flotation stage to the second, and a feedback connection conveys low density scrap back from the second flotation stage to the first such stage.

6 Claims, 2 Drawing Sheets

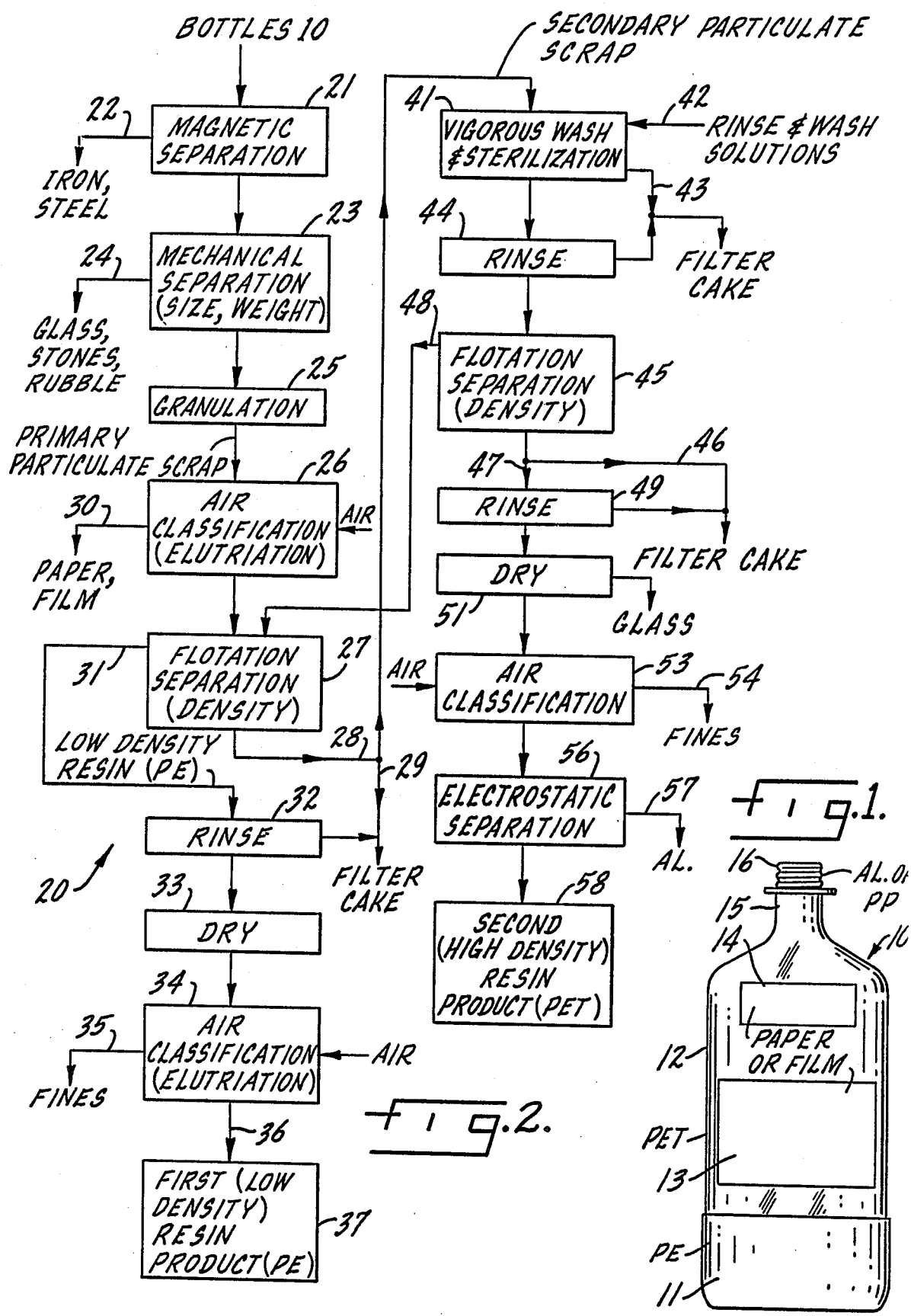

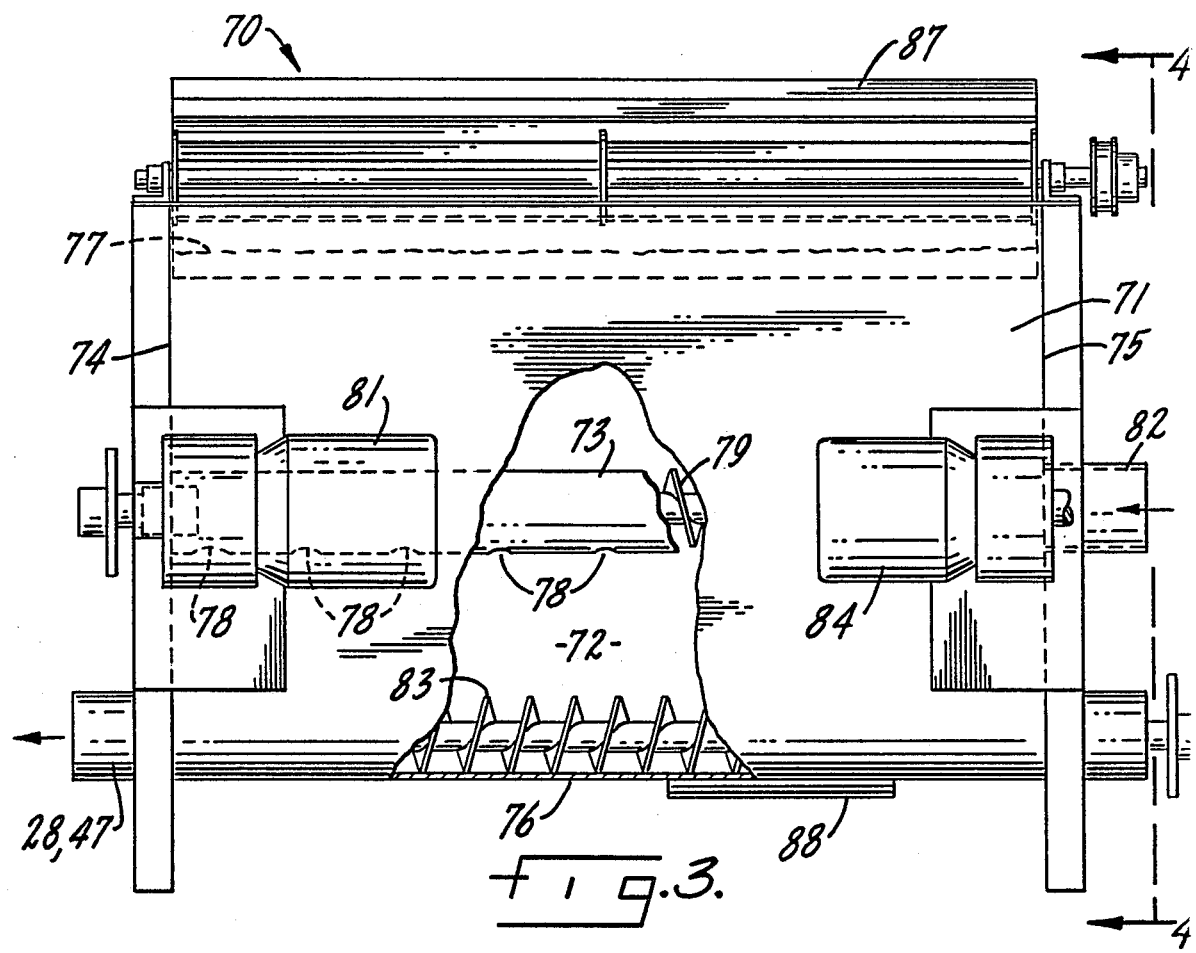
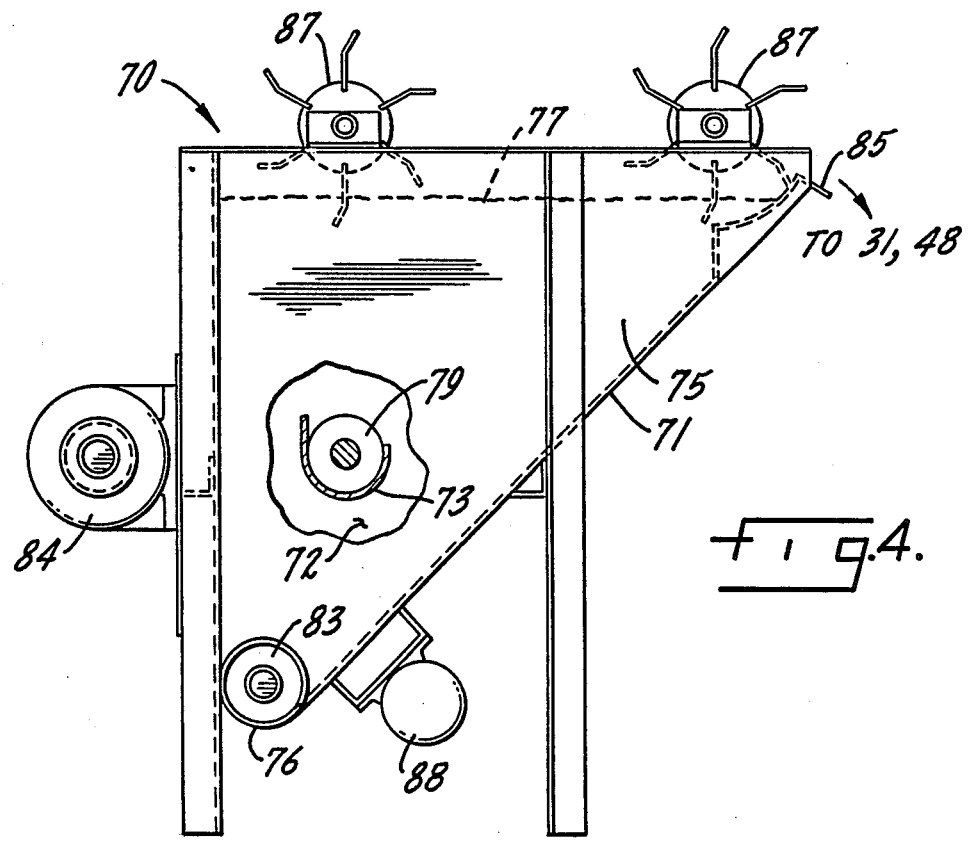

FLOTATION APPARATUS FOR RECLAIMING BONDED, TWO-RESIN ARTICLES

BACKGROUND OF THE INVENTION

Molded plastic bottles and like containers are in widespread and continually expanding use for a wide variety of liquids, powders, granulates, and other diverse products. The resins used in these bottles and containers include high-density polyethylene, polypropylene, polyethylene terephthlate, and others. As in any other manufacturing process, there is likely to be considerable scrap created due to flaws in the bottles or other containers created during molding operations. Other containers must be scrapped when identifying labels, usually paper but frequently and increasingly plastic film, are misapplied. These problems are particularly apparent when in-mold labelling and decoration are utilized; it has been estimated that 3% to 5% of plastic bottles, as manufactured, are rejected. Furthermore, plastic bottles and like containers are seldom acceptable for reuse as is; virtually every sound plastic bottle becomes a scrap bottle when emptied of its contents.

Effective and economical reclamation of scrap plastic bottles has been achieved in some instances, even when label materials must be removed during reclaiming operations. Thus, effective reclamation of reject blow-molded polyethylene containers for laundry-household liquids with paper labels secured to the containers by a heat-sealed gel lacquer has been successfully accomplished, using dry mechanical impact procedures. Other reclamation processes have also been used.

The problems of reclamation of plastic bottles and like scrap articles, however, are materially exacerbated when each bottle is formed of two or more components, bonded to each other, the components being molded of different resins. This situation is perhaps best exemplified by beverage bottles now in common use, formed of molded polyethylene terephthlate bodies bonded to high density polyethylene bases. These beverage bottles usually have aluminum or polypropylene caps; their labels may comprise paper or plastic film, usually polypropylene. Conventional types of apparatus used for plastic container reclamation, wet or dry, may not be efficient as applied to these bottles; in particular, they may not be as effective as desirable in breaking down the bond between the components of the two different resins so that those resins can be separated for subsequent use. They may also be less efficient than desirable in recovering all available polyethylene.

SUMMARY OF THE INVENTION

A primary object of the invention is to provide a new and improved flotation apparatus for use in a process for reclaiming reusable resin materials from scrap articles, such as bottles, formed of low density components of one resin bonded to high density components of another resin.

Accordingly, the invention relates to a system using dual flotation apparatus for reclaiming reusable resin materials from scrap articles comprising components formed of a first resin having a first, low density and components formed of a second resin having a second, higher density, each flotation apparatus comprising a tank, a liquid flotation medium filling the tank, the flotation medium having a density intermediate the first and second densities, a trough extending across the tank in spaced relation to the bottom of the tank but with the top of the trough not appreciably higher than the level of the flotation medium, the trough having a series of openings in the bottom thereof, and a first auger, positioned in and extending longitudinally of the trough. Inlet means are provided for introducing a flow of a particulate scrap material and said flotation medium into one end of the trough; a first main outlet, adjacent the bottom of the tank, is provided for discharging particles of the second, heavier resin from the tank, and a discharge weir affords a second main outlet for discharging particles of the first, lighter resin, by controlled overflow, from the tank.

In the system, primary flow connection means are provided, connecting the first main outlet of the first flotation apparatus to the inlet means of the second flotation apparatus. Feedback flow connection means connect the second main outlet of the second flotation apparatus back to the inlet means of the first flotation apparatus. The primary flow connection means includes a washing machine for vigorously washing particles flowing from the first flotation apparatus to the second flotation apparatus.

BRIEF DESCRIPTION OF THE DRAWINGS

FIG. 1 is an elevation view of a bottle representative of the scrap articles which the apparatus of the present invention may be used to reclaim;

FIG. 2 is a system diagram and flow chart illustrating the steps of a method that employs the flotation apparatus of the invention;

FIG. 3 is a partially sectional side elevation view of a flotation separation apparatus constructed in accordance with one embodiment of the invention and used in two stages of the reclamation system of FIG. 2; and FIG. 4 is a partly sectional elevation view taken approximately along line 4—4 in FIG. 3.

DESCRIPTION OF THE PREFERRED EMBODIMENTS

The beverage bottle 10 shown in FIG. 1 is typical of many plastic containers which, when improperly formed or when emptied, comprise scrap articles appropriate for reclamation by use of the present invention. Bottle 10, for example, is commonly used for both carbonated and non-carbonated beverages, usually in one-half, one and two liter sizes. The base 11 of bottle 10, which is frequently black in color, is usually molded of a light weight resin. The most frequently used resin for base 11 is high density polyethylene, referred to herein as "PE". Base 11 is bonded to a main body 12 molded from a second resin of greater density, most frequently polyethylene terephthalate, referred to herein as "PET". The adhesive bond between base 11 and container body 12 is quite strong; separation of base 11 from the main body 12 of the bottle, in use, is not permissible.

Bottle 10 usually carries one or more labels, such as labels 13 and 14, that are adhesively affixed to the main body 12 of the bottle. Labels 13 and 14 are often formed of paper. On the other hand, a lightweight plastic film such as a film of polypropylene ("PP") may be employed for the labels. At its top, bottle 10 has a neck 15 closed by a conventional cap 16. Cap 16 may be of molded plastic, usually polypropylene; more frequently the cap is is formed of aluminum.

A reclamation system 20 is illustrated in the block diagram/flow chart, FIG. 2. System 20 starts with a magnetic separation input stage 21. The ferrous metal scrap is discharged from stage 21 at a waste outlet 22. The next stage 23 may include two or more inclined conveyors up which the light-weight empty bottles 10 can travel but which will not transport stones, glass, and other small or heavy rubble items. This rubble is discharged from stage 23 to another waste outlet 24. The essentially unusable scrap discharged through the waste outlets 22 and 24 is discarded.

The next stage 25 comprises a granulator for comminuting scrap articles (the bottles 10) to form a primary particulate scrap. In a typical installation stage 25 may be a Nelmor Co. Inc. Model G1830M granulator having a three-blade open rotor with an involute, tangential feed entry. The granulator chops the bottles 10 into chips or flakes, preferably of approximately three-fourths inch maximum dimension. The chip size can be varied to some extent, but this size is most manageable in the overall process of system 20. This primary particulate scrap is discharged from stage 25 to an air classification stage 26.

Stage 26 may comprise two cyclone separators connected in sequence; it is utilized to separate paper and other film materials, usually labels, from the primary particulate scrap that constitutes the input to stage 26. The paper and other film materials are discharged from stage 25 through an outlet 30 and are discarded. The remaining primary particulate scrap fed into a first flotation stage 27.

The primary particulate scrap supplied to flotation stage 27 includes chips or particles formed of a first light weight resin, in this instance the PE resin from base 11 of bottle 10 (FIG. 1). This same primary particulate scrap also includes a substantial quantity of chips of the heavier, denser PET resin which forms bottle body 12. The input to stage 27 further includes chips composed of particles of both of the PE an PET resins, bonded to each other. There are also particles of aluminum (from bottle caps 16) and some remaining traces of paper or resin film from labels 13 and 14.

Flotation stage 27 comprises a flotation tank filled with a liquid that has a density intermediate the density of the first resin, such as the PE from base 11, and the density of the heavier second resin, in this instance the PET from bottle body 12. Because water has a density intermediate that of PE and PET it may be used as the flotation medium in flotation step 27. Usually, the flotation medium is an aqueous solution, as discussed hereinafter in connection with FIGS. 3–5, though other liquids may be employed. The heavier, denser resin (PET) settles to the bottom of the tank and is drawn off through a first main outlet 28. Fine particles are removed, as filter cake, through a conduit 29 that may be part of a fluid recirculation arrangement (not shown) for the flotation tank. The lightweight resin (PE), however, floats on the liquid in stage 27 and hence can be drawn off through a second main outlet 31 leading to a rinse stage 32. If caps 16 or other components from which the scrap is made are formed of polypropylene, the resulting PP chips also float off and are discharged with the PE chips through outlet 31.

Rinse stage 32 for the low density resin (PE) may comprise a rinsing flume to remove liquid contaminants, and is followed by a centrifugal dryer 33. The dry first resin (PE) from the outlet of stage 33 is supplied to an air classification stage 34. Stage 34 may be a duplicate of stage 26, or it may comprise a cascade labyrinth type of air classifier. Fine particles and any remaining paper or film are discharged from stage 34 through a waste outlet 35. The main outlet 36 from stage 34 discharges a reusable low density first resin material consisting essentially of clean, dry polyethylene chips; see stage 37. A further size reduction for the PE chip output from outlet 36 may be carried out if desired.

Referring back to the first flotation stage 27 of system 20, FIG. 2, it may be seen that its first main outlet 28, for high density material, discharges a secondary particulate scrap into a wash and sterilization stage 41. In stage 41, the chips of PET and PE/PET and the traces of aluminum, PE and paper or PP that constitute this secondary particulate scrap are first rinsed in hot water, then vigorously and violently washed in a washing and sterilizing solution introduced through an inlet 42, followed by a further hot water rinse. The washing and sterilizing solution is preferably hot water plus an alkaline base detergent (e.g., OAKITE No. 161 or TURBOLENE) with potassium hydroxide or sodium hydroxide. That kind of solution precludes build-up of microorganisms and assists in separating PE and other particles from the PET chips in the secondary particulate scrap. A number of different forms of washing and sterilizing equipment could be used in stage 41. One efficient washing and sterilizing apparatus effectively usable in stage 41 is a high speed agitating washer incorporating two rotating agitators having operating speeds of 1750 rpm, with a washing sequence control and drain ports, sold by Nelmor Co., Inc. under the trade designation WASHLUX. In stage 41 all rinse and wash liquids are introduced into the top of the washing equipment and drained from the bottom, enhancing the effectiveness of the final rinse. There is a filter output 43 from stage 41, a part of a rechargeable counter-current filtration system used to remove waste byproducts in the form of filter cake. The washing and sterilizing solution may be fully or partially recirculated back to stage 41 through input 42.

The secondary particulate scrap from stage 41 is fed to the next stage 44 of system 20 where it may be subjected to a further cleaning rinse to remove any remaining traces of the detergents and other chemicals used in the sterilization and washing apparatus of stage 41. In this secondary particulate scrap, the bonds in any chips or particles containing both of the first and second resins have been broken down, disrupted by the washing/sterilizing action of stage 41. Thus, in the output from stage 41 to stage 44 there are virtually no more chips or flakes containing both the first and second resins (PE and PET); essentially all of the particles are one resin or the other but not both. This is also true of any label particles that may have remained bonded to either PET or PE chips or flakes through stage 27.

The next stage 45 in system 20 is a flotation stage that is essentially a duplicate of stage 27. As before, there is a filtered output 46, which may be a part of a flotation fluid recirculation arrangement, from which the filter cake is discarded. There is a first main output 47 that passes the heavier particles from stage 45 on to the next stage 49. The second, flotation output 48 from stage 45, consisting primarily of particles of polyethylene, is returned to the input of the first flotation stage 27. The material from output 48 may also include traces of PET particles and other trace materials (aluminum, PP, etc.)

Stage 49 is a rinse flume and is followed by a dryer 51 for the dense particulate PET material received from the main output 47 from the bottom of flotation stage 45. A centrifugal dryer is suitable. Any heavy scrap, such as glass, that still accompanies the PET chips may be discharged from dryer stage 51 through an waste outlet 52. The main output from dryer 51 is connected to an air classification stage 53. Stage 53 is preferably a cascade type air classifier.

Dust and other fines from air classifier 53 are removed through a waste outlet 54. The main output from stage 53, consisting primarily of particles of the heavier PET resin plus some aluminum particles, is fed into a conventional electrostatic metal separator stage 56, which utilizes a high intensity, high gradient electrostatic charge applied to the particulate material. Aluminum particles are discharged to an outlet 57. The aluminum from outlet 57 may be marketable if adequate control is exercised over the input to system 20 so that undue contamination with other metals is avoided.

The principal output from separator 46 is a reusable second resin material, relatively pure PET, in clean, dry chip form; see stage 58. An additional grinder or granulator stage may be provided for further size reduction of the PET material 58, just as in the case of the PE material 27. However, this additional grinder is not essential to the basic process.

FIGS. 3 and 4 illustrate a flotation apparatus 70 that is usable for stage 27 and also for stage 48 in the overall resin reclamation system 20 of FIG. 2. Flotation apparatus 70 comprises a tank 71 filled with a liquid flotation medium 72. The flotation medium 72 should have a density intermediate the densities of the first and second resins, in this instance polyethylene and polyethylene terephthlate. For bottles 10, in which the major components are PE and PET, water affords a usable flotation medium because it has a density intermediate the two resins. In most instances, however, it is necessary or desirable to recirculate or reuse the flotation liquid, so that water alone is not particularly desirable. Thus, solutions that include detergents, fungicides, bactericides, wetting agents, water softeners and other like additives are preferable.

A trough 73 is mounted in tank 71, extending from one tank end wall 74 to the other end wall 75. Trough 73 is located well above the tank bottom 76; however, the top of the trough should be below the upper level 77 of the flotation medium 72. There are a series of openings 78 in the bottom of trough 73. A first or input auger 79 extends longitudinally of the trough. Input auger 79 is driven by appropriate means such as a motor 81.

Flotation apparatus 70 includes inlet means 82 for introducing a flow of particulate scrap material and the flotation liquid into one end of trough 73. In this instance, inlet conduit 82 is located at the right-hand end of trough 73 as seen in FIG. 3. The particulate material supplied to apparatus 70 through inlet 82 is derived from the outlet of either stage 26 or stage 44 in system 20; see FIG. 2. Auger 79 impels the contents of trough 73 from inlet 82 toward the trough openings 78.

Flotation apparatus 70 has a first main outlet, located at one end of the bottom 76 of tank 71, for discharging particles of the second, heavier resin (PET) from the tank. In FIG. 3 the first main outlet is identified by reference numerals 28 and 47, in conformity with the use of those numerals in FIG. 2. This first main outlet 28,47 is aligned with a relatively large auger 83 that extends along the bottom of tank 71 and is driven by appropriate means such as a motor 84. Apparatus 70 also has a discharge weir 85 at one side of tank 71; weir 85 is connected to a second main outlet identified by reference numerals 31 and 48 from FIG. 2. A pair of paddle wheels 87, which may be driven from motor 81, maintain a steady movement of the surface portion of liquid 72 toward weir 85. A vibrator 88 may be mounted on tank 71; the vibrator is unnecessary in some instances but may be required in others.

In operation, assuming that apparatus 70 is utilized as the flotation separation stage 27 in system 20, the primary particulate scrap is introduced into trough 73 through inlet 82 in conjunction with a flow of the aqueous solution that constitutes flotation medium 72. The light weight chips of polyethylene, with perhaps some of polypropylene, float to the surface 77 of medium 72. Those lightweight resin particles, aided by paddle wheels 87, flow over weir 85 and are discharged through outlet 31. The heavier PET chips and flakes are propelled along trough 73 by auger 79 and pass through the bottom openings 78 into the lower part of tank 71. The heavier PET articles accumulate along the bottom 76 of tank 71 and are propelled out through the first main outlet 28 by auger 83.

The operation is the same for the second flotation separation stage 45 of system 20. Only a minor portion of the original light weight (polyethylene) particles reach stage 45 and most of this lightweight resin content in the secondary particulate scrap supplied to stage 45 comes from the separation of bonded dual-resin particles in the wash stage 41. In any event, the major difference is that the light weight resin particles discharged through outlet 48 of apparatus 70, as used for stage 45, are returned to stage 27 so that the polyethylene can be salvaged, as previously described.

In flotation apparatus 70, as used for either stage 27 or stage 45 in system 20 (FIG. 2), the heavy resin chips may tend to accumulate tiny air bubbles on their surfaces, depending to some extent on the flotation medium 72, the specific heavy resin involved, and other factors. If the specific gravity (density) of the heavy resin is only slightly greater than that of the flotation medium, the resin particles may not settle out in the manner necessary to effective operation of flotation apparatus. In these circumstances vibrator 88 may be employed to dislodge the air from the resin chip surfaces. Vibration at various frequencies may be utilized; ultrasonic vibration is usually most effective.

System 20, including the flotation stages comprising the apparatus of the present invention, can be applied to reclamation of virtually any two-resin articles, in which the resins are in separate components bonded to each other, so long as there is an appreciable difference in density between the resins and a suitable flotation medium is available. The same system can be extended to three-resin articles, provided there is an effective basis for further separation of one of the light or heavy resin outputs to segregate the third resin. System 20 is quite energy-efficient, as well as highly effective in separating the different resins, due in large part to the sequence of its initial flotation separation stage 27, the vigorous washing stage 41 that breaks up two-resin chips, and the further flotation separation stage 45 with its light weight feedback to stage 27.

I claim:

1. A system for reclaiming reusable resin materials from scrap articles each comprising at least one component formed of a first resin having a first, low density, bonded to at least one component formed of a second resin having a second, higher density, comprising:
   a first flotation apparatus and
   a second flotation apparatus, each flotation apparatus including:

a tank filled with a liquid flotation medium having a density intermediate the first and second densities;

a trough extending across the tank in spaced relation to the bottom of the tank but with the top of the trough lower than the level of the flotation medium, the trough having a series of openings in the bottom thereof;

a first auger, positioned in and extending longitudinally of the trough;

drive means for rotating the first auger;

inlet means for introducing a flow of a particulate scrap material and said flotation medium into one end of the trough;

a first main outlet, adjacent the bottom of the tank, for discharging particles of the second, heavier resin from the tank; and a discharge weir affording a second main outlet for discharging particles of the first, light resin, by controlled overflow, from the tank;

the system further comprising:

primary flow connection means connecting the first main outlet of the first flotation apparatus to the inlet means of the second flotation apparatus;

the primary flow connection means including washing machine means for vigorously washing particles flowing from the first flotation apparatus to the second flotation apparatus to disrupt the bond in any particles containing both resins; and feedback flow connection means connecting the second main outlet of the second flotation apparatus back to the inlet means of the first flotation apparatus.

2. A resin reclamation system according to claim 1 in which the scrap particles are bottles, the first resin is polyethylene, the second resin is polyethylene terephthalate, and the flotation medium in each flotation apparatus is an aqueous fluid.

3. A resin reclamation system according to claim 1 in which the washing machine means includes a washing medium comprising a detergent solution.

4. A resin reclamation system according to claim 1 in which each flotation apparatus further comprises:

a second auger, in the bottom of the tank, for impelling particles of the second resin to and through the first main outlet; and drive means for rotating the second auger.

5. A resin reclamation system according to claim 4 in which the scrap articles are bottles, the first resin is polyethylene, the second resin is polyethylene terephthalate, and the flotation medium in each flotation apparatus is an aqueous fluid.

6. A resin reclamation system according to claim 1 in which each flotation apparatus further comprises:

vibrator means for vibrating the contents of the tank to release any air bubbles adhering to the particulate scrap material;

paddle means for continuously moving the top portion of the flotation medium toward the discharge weir.

* * * * *